(No Model.) 2 Sheets—Sheet 2.
M. E. NORTHEN.
DRESS CHART.
No. 325,216. Patented Aug. 25, 1885.
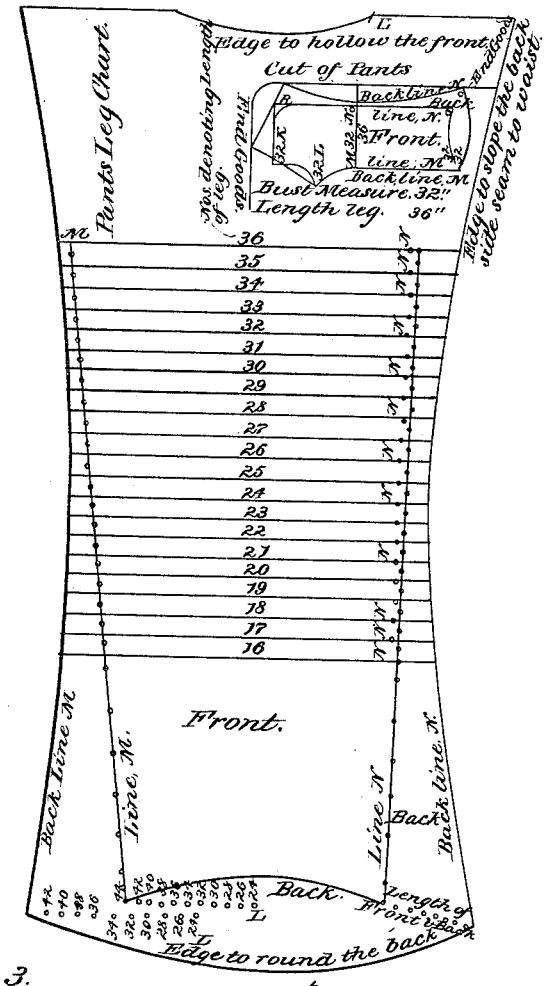
Fig. 6.
Fig. 3.
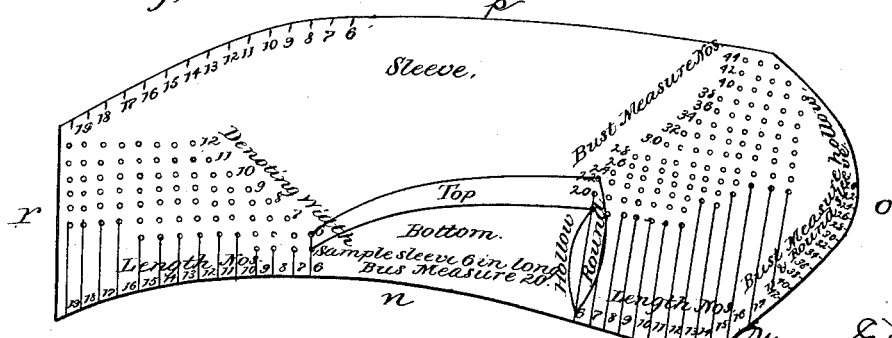
WITNESSES
C. W. Dashrell
E. G. Siggers
Mary E. Northen
INVENTOR
by C. A. Snow & Co.
Attorneys

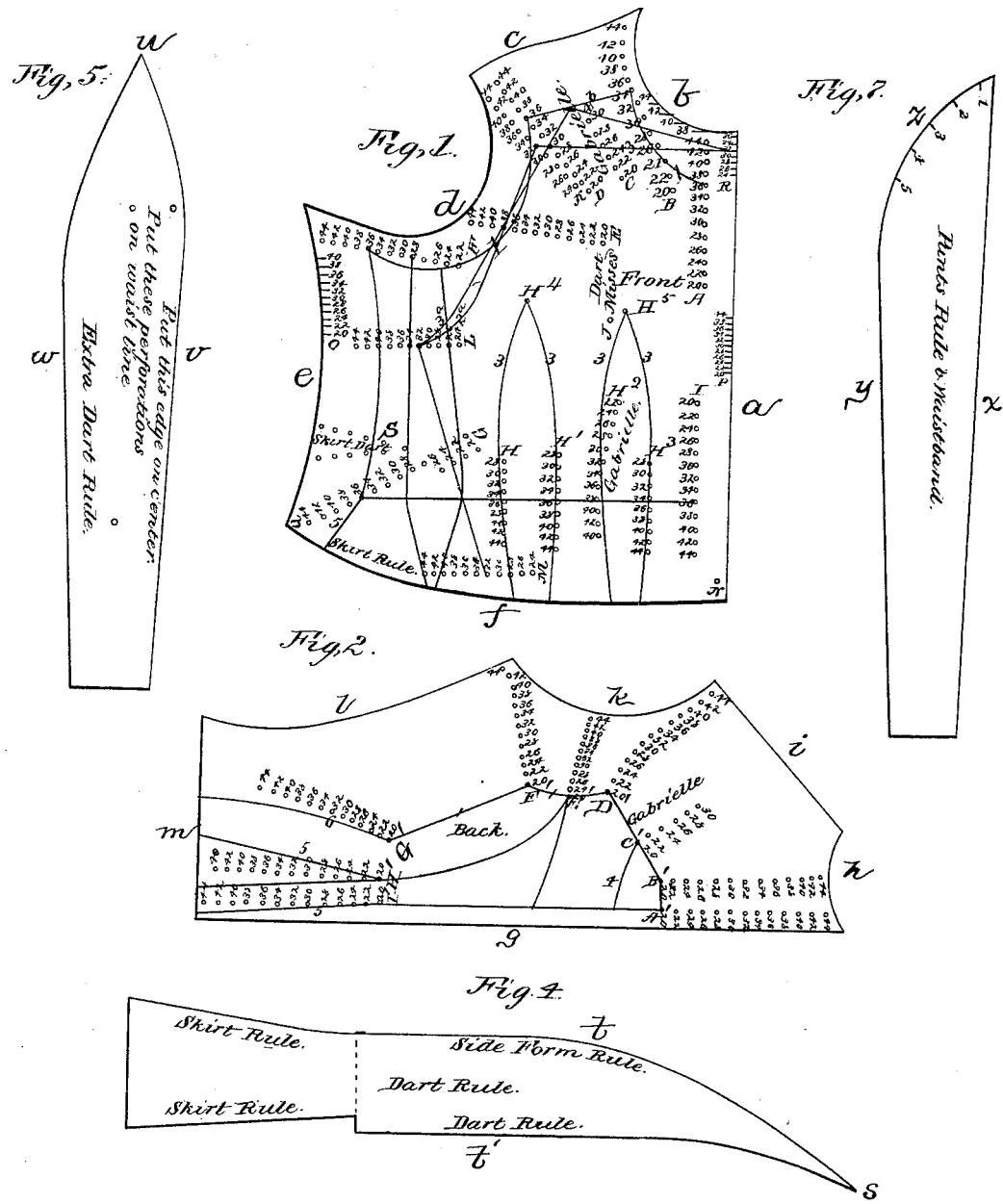

UNITED STATES PATENT OFFICE.

MARY EVA NORTHEN, OF LANIER, TEXAS.

DRESS-CHART.

SPECIFICATION forming part of Letters Patent No. 325,216, dated August 25, 1885.

Application filed May 21, 1884. (No model.)

*To all whom it may concern:*

Be it known that I, MARY EVA NORTHEN, a citizen of the United States, residing at Lanier, in the county of Cass and State of Texas, have invented a new and useful Dress-Chart, of which the following is a specification, reference being had to the accompanying drawings.

This invention has relation to pattern-charts for cutting any and all garments, either for gentlemen, ladies, or children; and it consists in the construction and novel arrangement of a series of rules composed of sheet metal or pasteboard perforated and provided with printed outlines, figures, and letters of reference to be followed in ruling the outlines of the parts of the garment to be cut from the goods, as will be hereinafter fully described, and particularly pointed out in the claims.

Figure 1 shows the front-waist rule, which also contains the bust rule for pants. Fig. 2 shows the back rule. Fig. 3 shows the sleeve-rule. Fig. 4 shows the dart-rule and skirt-rule. Fig. 5 shows the extra dart-rule. Fig. 6 shows the pants-leg chart, and Fig. 7 shows pants-rule and waist band rule. These several rules are respectively formed and marked with perforations, lines, and figures, as represented in the drawings, and are formed either of sheet metal or cardboard. The front-waist rule (shown at Fig. 1) has the straight front edge, $a$, on which are marked the scales P and R, and the point N; the neck-curve $b$, the compound shoulder-curve $c$, the arm-hole curve $d$, the back-curve $e$, having the scale of figures O, and the bottom curve, $f$. Near the front edge of the rule is a vertical row of figures and perforations, I, indicating inches, and above this scale is a similar row of figures and perforations, A. A curved scale of figures and perforations, B, conforms substantially to the contour of the neck-curve.

C represents a scale arranged obliquely near scale B; and D is an obliquely-arranged scale that extends nearly to the point formed by the meeting of curves $c$ and $d$. A similar scale, K, is arranged near scale D, and extends at a different angle therefrom.

E represents a horizontal scale that extends to about the center of the arm-hole curve $d$. On the under side of this curve is arranged a scale, F.

L represents a horizontal scale extending nearly to and slightly above the center of back-curve $e$. An oblique scale, G, extends to the point Q, where the lines $e$ and $f$ meet, and along the lower portion of the rule are arranged the curved scales H, H', $H^2$, and $H^3$, which form darts, of which the letters $H^4$ and $H^5$ indicate the points.

M represents a scale arranged near the lower edge of the rule, and S is a dart extending from the curved back $e$. The back-rule has a straight edge, $g$, neck-curve $h$, shoulder-edge $i$, arm-hole curve $k$, back-curve $l$, and bottom straight-edge $m$, and is provided with the series of perforated and figured scales A', B', C', D', E', F', G', H', and I', as shown. The sleeve-rule (shown at Fig. 3) has the curved sides $n$ and $p$, the curved top $o$, and the straight bottom $r$, and is further provided with the series of perforated figured scales, as shown. The dart rule (shown at Fig. 4) has the point $s$ and the differently-curved sides $t$ $t'$. The extra dart-rule (shown at Fig 5) has the point $u$ and the curved sides $v$ $w$, and is perforated in three places, and inscribed with directions for its use. The pants-leg chart, Fig. 6, is shaped as shown, and provided with the series of perforated scales, and the inscribed directions and diagrams fully illustrated thereon. The pants-rule and waistband (shown at Fig. 7) has the edge $x$, the edge $y$, arranged at a slight angle thereto, and the curved line $z$, connecting the edges.

In order to cut a pattern by means of my dress-charts, it is only necessary to take two measurements of the person—one around the bust, and the length of the waist down the center of the back.

Charts thus constructed are adapted for use in cutting all garments worn by men, women, or children, are easily and quickly understood, and insure a good fit to persons having ordinarily good forms.

Among the advantageous points of my invention are the allowance made on the chart for the extra under-arm dart, and the rule by which to shape it; the separate skirt-scale cut according to the skirt-measure; the skirt-dart for fitting skirts over the hips; the skirt-rule attached to bottom of dart-rule for starting skirt from waist in the back. The bust-measure on the sleeve-chart obviates the necessity of measuring the width of sleeve or arm-hole of garments.

Having thus fully described my invention, what I claim as new, and desire to secure by Letters Patent of the United States, is—

1. The front-waist chart having the curved perforated scales H, H', $H^2$, and $H^3$, which form darts having points $H^4$ and $H^5$, in combination with a dart-rule having curved sides, substantially as described.

2. The front-waist chart having the curved perforated scales H, H', $H^2$, and $H^3$, which form darts having points $H^4$ and $H^5$, and the dart S, in combination with a dart-rule having curved sides, substantially as described.

3. The front-waist chart having the curved perforated scales H, H', $H^2$, and $H^3$, which form darts having points $H^4$ and $H^5$, the skirt-dart S on the back, and the perforated and numbered scales A, B, C, D, K, E, F, O, G, I, and P, arranged as shown, substantially as described.

4. The combination, with the dress-charts, of the dart-rule shown in Fig. 4, having the curved side $t$, the point $s$, and the partly-curved and partly-straight side $t'$, substantially as described.

In testimony that I claim the foregoing as my own I have hereto affixed my signature in presence of two witnesses.

MARY EVA NORTHEN.

Witnesses:
NETTIE KINSER,
LUCY ANN MURRAY.